(12) United States Patent
Parzy et al.

(10) Patent No.: US 10,583,431 B2
(45) Date of Patent: Mar. 10, 2020

(54) PORTABLE CONTAINMENT DEVICE FOR MANIPULATING ORGANIC AND/OR CHEMICAL SUBSTANCES, AND REMOVABLE CONTAINMENT ENCLOSURE FOR SUCH A DEVICE

(71) Applicant: K-Plan, Villeurbanne (FR)

(72) Inventors: Dominique Parzy, Saint-Cyr-sur-le-Rhône (FR); Sébastien Parzy, Lyons (FR); Cyril Desmoort, Villefranche sur Saone (FR)

(73) Assignee: QUATTROCENTO, Paris (FR)

( * ) Notice: Subject to any disclaimer, the term of this patent is extended or adjusted under 35 U.S.C. 154(b) by 333 days.

(21) Appl. No.: 15/514,262

(22) PCT Filed: Sep. 26, 2015

(86) PCT No.: PCT/FR2015/052570
§ 371 (c)(1),
(2) Date: Mar. 24, 2017

(87) PCT Pub. No.: WO2016/046507
PCT Pub. Date: Mar. 31, 2016

(65) Prior Publication Data
US 2018/0229229 A1    Aug. 16, 2018

(30) Foreign Application Priority Data

Sep. 26, 2014  (FR) ...................................... 14 59155
Dec. 8, 2014   (FR) ...................................... 14 62085

(51) Int. Cl.
*B01D 50/00*       (2006.01)
*B01D 59/50*       (2006.01)
(Continued)

(52) U.S. Cl.
CPC .................. *B01L 1/02* (2013.01); *B01L 1/04* (2013.01); *B08B 15/026* (2013.01); *B25J 21/02* (2013.01);
(Continued)

(58) Field of Classification Search
None
See application file for complete search history.

(56) References Cited

U.S. PATENT DOCUMENTS 4,505,190 A * 3/1985 Fink .................... B08B 15/026
                                                        138/97
5,062,871 A * 11/1991 Lemon, III .......... B08B 15/026
                                                        134/200
(Continued)

*Primary Examiner* — Amber R Orlando
*Assistant Examiner* — Phillip Y Shao
(74) *Attorney, Agent, or Firm* — MacMillan, Sobanski & Todd, LLC

(57) ABSTRACT

The invention relates to a portable containment device for manipulating organic and/or chemical substances, which includes:
  a transporting case including two half-cases (2, 3) connected by a hinged structure (4) such as to be movable between a closed position (F), in which the half-cases (2, 3) are against one another and define a stowing space for at least the hinged structure (4), and an open position (O), in which the half-cases (2, 3) are spaced apart from one another by being maintained vertical by the hinged structure (4) and in which the half-cases (2, 3) and the hinged structure (4) form a supporting structure for a flexible containment enclosure (20);
  and a plastic, removable and flexible containment enclosure (20) that is at least partially transparent, for forming a generally parallelepiped foldable isolation chamber provided with means (31, 32) for accessing the inside of the enclosure and with means (21) for attachment to the supporting structure. The contain-
(Continued)

ment enclosure (20) is collapsible inside the transporting case in the closed position (F). The invention also relates to a removable, flexible enclosure for such a device.

22 Claims, 6 Drawing Sheets

(51) Int. Cl.
*B01L 1/02* (2006.01)
*B08B 15/02* (2006.01)
*B25J 21/02* (2006.01)
*G21F 7/04* (2006.01)
*B01L 1/04* (2006.01)

(52) U.S. Cl.
CPC ........ *G21F 7/045* (2013.01); *B01L 2200/082* (2013.01); *B01L 2200/18* (2013.01); *B01L 2300/123* (2013.01)

(56) References Cited

U.S. PATENT DOCUMENTS

| | | | | |
|---|---|---|---|---|
| 5,074,897 A | * | 12/1991 | Sikich | B08B 15/026 454/58 |
| 6,793,617 B2 | * | 9/2004 | Ford | B08B 15/026 128/847 |
| 7,134,444 B2 | * | 11/2006 | Mintie | B08B 15/00 135/131 |
| 7,596,957 B2 | * | 10/2009 | Fuhr | B25J 21/02 62/78 |
| 8,234,822 B2 | * | 8/2012 | Proctor | B08B 15/026 135/139 |
| 9,055,799 B2 | * | 6/2015 | Cohn | A45C 11/22 |
| 9,574,399 B2 | * | 2/2017 | Harber | E06C 1/125 |
| 2010/0044372 A1 | * | 2/2010 | Kournikakis | B01L 1/04 220/9.2 |
| 2017/0056270 A1 | * | 3/2017 | Ballantyne | A61G 10/005 |

\* cited by examiner

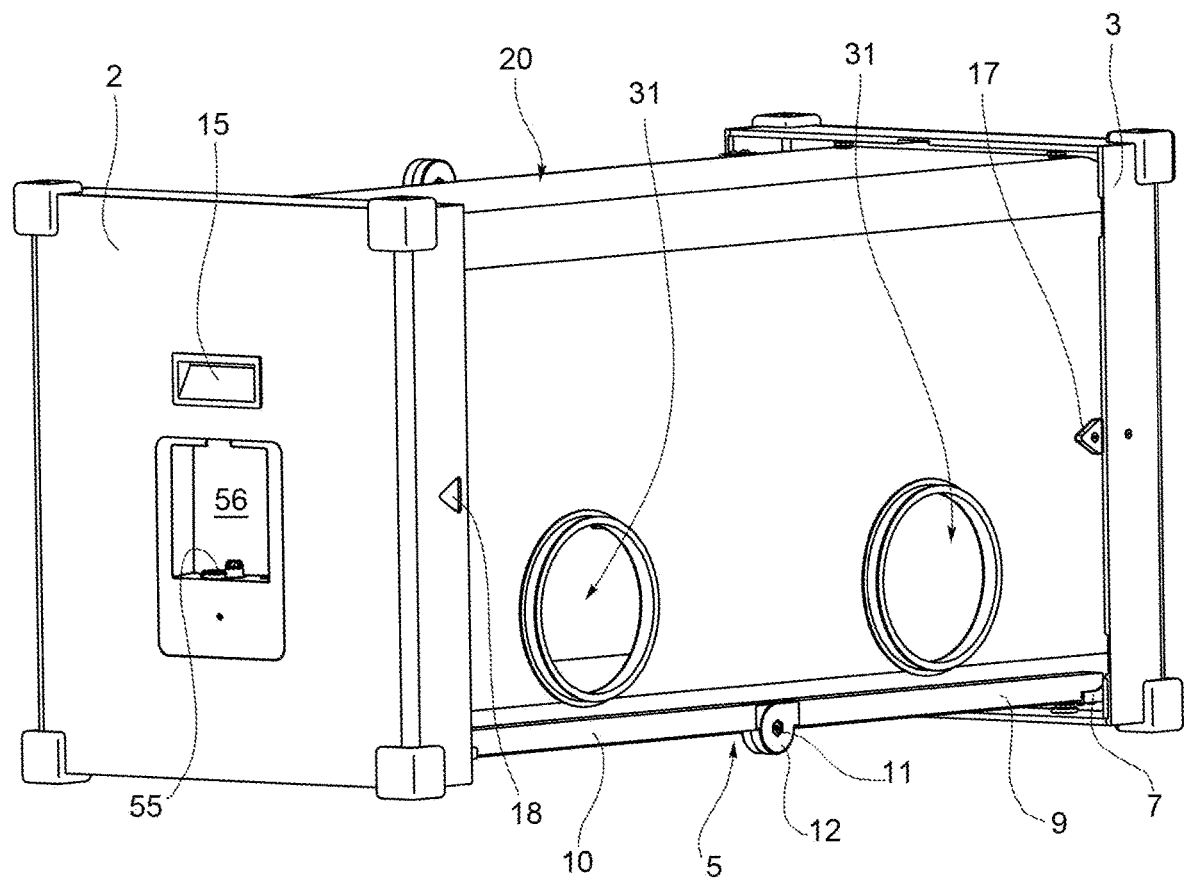
FIG. 3
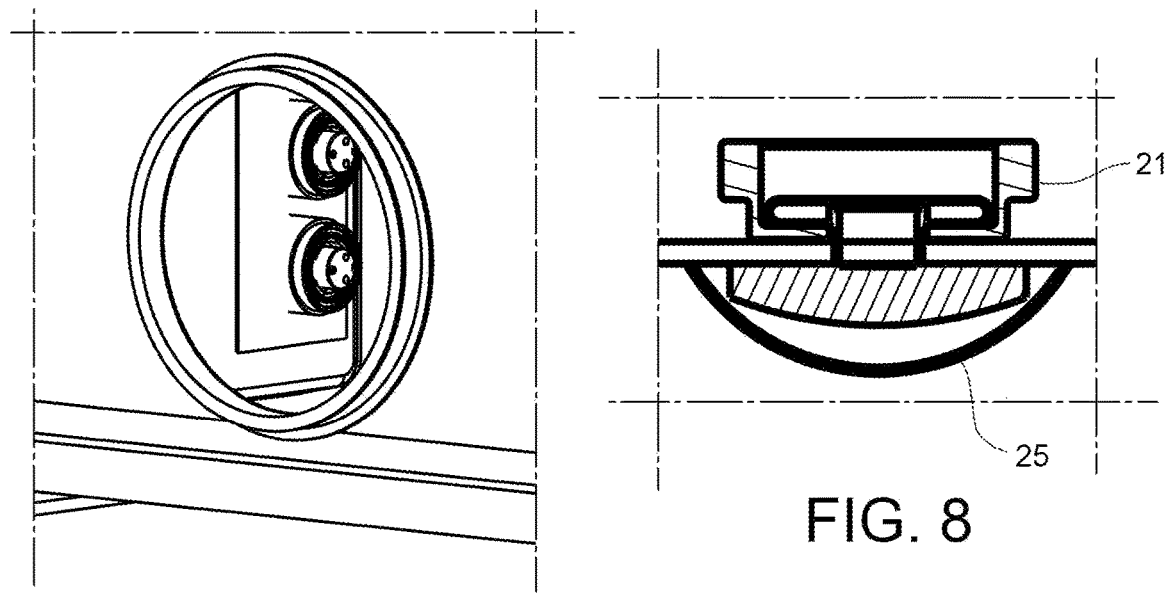
FIG. 9
FIG. 8

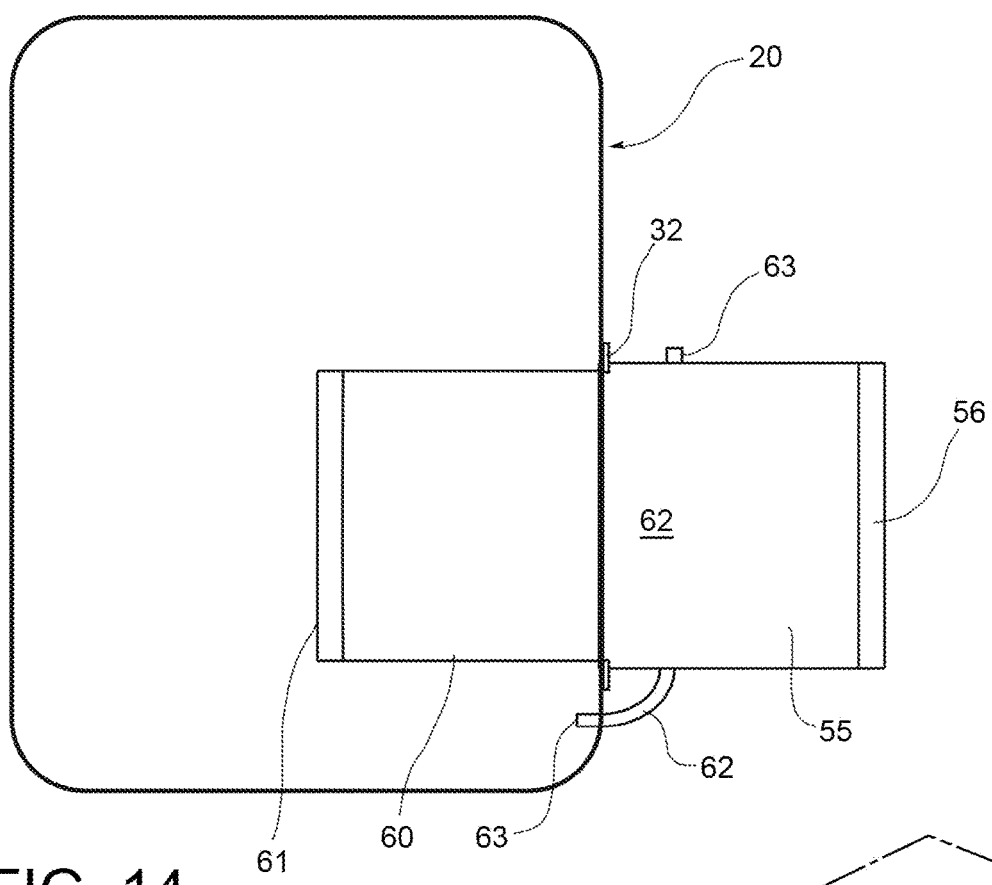
FIG. 14
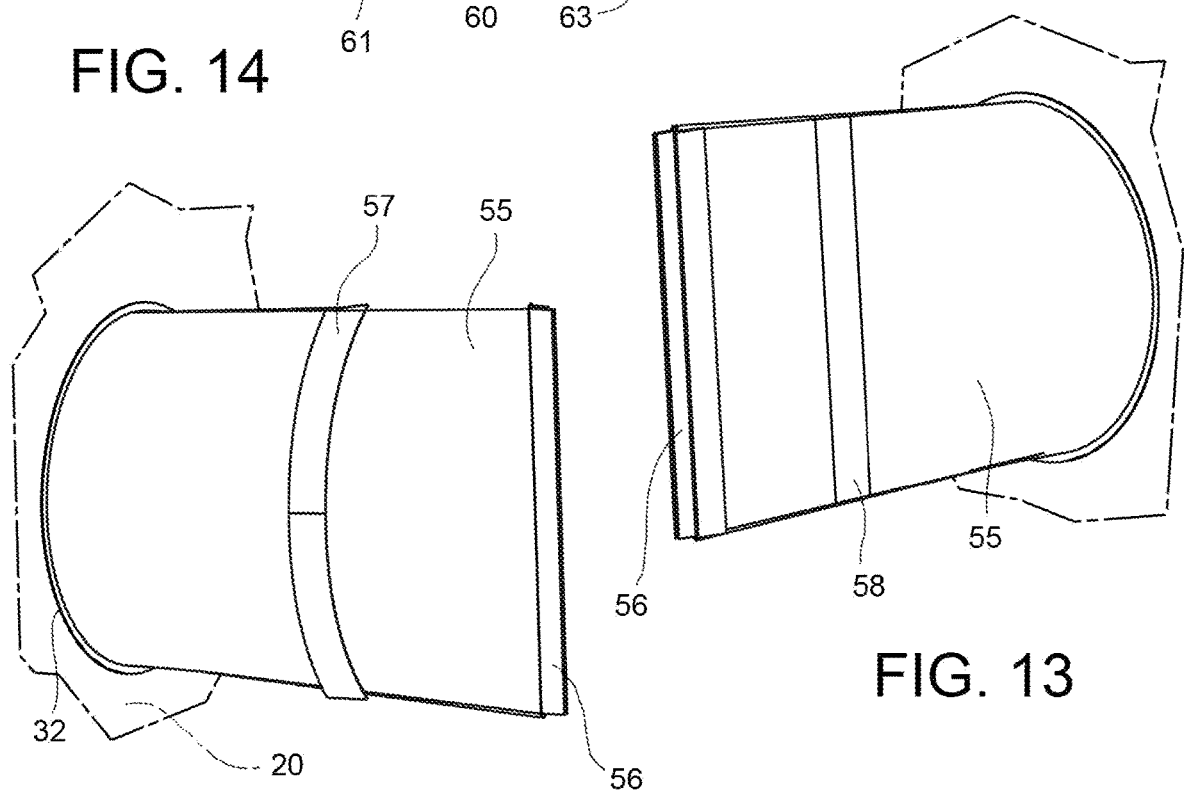
FIG. 13
FIG. 12

PORTABLE CONTAINMENT DEVICE FOR MANIPULATING ORGANIC AND/OR CHEMICAL SUBSTANCES, AND REMOVABLE CONTAINMENT ENCLOSURE FOR SUCH A DEVICE

This is a national stage application filed under 35 U.S.C. § 371 of international application PCT/FR2015/052570, filed under the authority of the Patent Cooperation Treaty on Sep. 26, 2015, published; which claims the benefit of Patent Application Nos. FR 1459155 filed Sep. 26, 2014, and FR 1462085 filed Dec. 8, 2014. The entire disclosures of all the aforementioned applications are expressly incorporated herein by reference for all purposes.

This invention relates to the technical area of containment devices such as hoods and/or glove boxes used for manipulating chemical and/or organic products under containment conditions guaranteeing the integrity of the products handled as well as the safety of the operator(s). In a preferred application, the invention relates to such portable containment devices, in other words, devices that are able to be carried by one single adult and that present a mass less than 30 kilograms.

It is known of the containment devices made in the form of a plastic material enclosure comprising flexible, transparent PVC panels, assembled to form a pyramid intended to be suspended. This pyramid thus comprises an opening for products to be introduced to be handled, as well as long-sleeve gloves attached to one of the walls to enable the manipulating of products inside the enclosure.

Such a containment device actually enables the completely safe manipulating of toxic or dangerous products, but presents the disadvantage of having to be suspended to take its pyramid shape, while its flexible base does not enable it to be placed in a stable position, the containers containing the products to be handled. Yet, it is difficult to find a support structure suitable to hang from the top of the pyramid, while offering support for its base. In addition, the pyramid shape induces the existence on the sides of lower areas, wherein it is difficult to proceed with manipulating without coming into contact with the walls. Moreover, the gloves integrated into the walls are made from a similar material to that of the walls, and are generally too thick to enable the manipulating of accessories that require great precision, as this is particularly the case in pipetting systems. In addition, the gloves cannot be changed in such a way that all users of the device must use the same gloves, which is not comfortable, nor hygienic.

A patent request US20100044372 has proposed a transporting case formed from two half-cases connected by hinges, in such a way that in an open position from the case, the half-cases remain connected and adjacent to a longitudinal edge. The transporting case is thus used to store in a closed position, a flexible containment enclosure and a support structure that can be disassembled. When the containment enclosure must be used, the case is opened and placed on a support, in such a way that one of the half-cases forms a tray. Then, the enclosure is pre-formed by taking the shafts that form the supporting structure into the gussets of the enclosure, then by assembling the shafts together, this operation requiring a laborious assembly procedure and requiring a certain amount of time.

It is therefore apparent, that there is a need for a containment device which brings a solution to the disadvantages above, by offering a great ease of implementation, as well as working conditions that are compatible with the needs of users according to the type of products handled and the risks induced.

In order to achieve this objective, the invention relates to a portable containment device for manipulating organic and/or chemical substances, which includes:
  a transporting case including two half-cases connected by a hinged structure such as to be movable between a closed position in which the half-cases are against one another and define a stowing space for at least the hinged structure, and an open position in which the half-cases are spaced apart from one another by being maintained vertical by the hinged structure and in which the half-cases and the hinged structure form a supporting structure for a flexible containment enclosure,
  and a plastic, removable, flexible containment enclosure that is at least partially transparent, for forming a generally parallelepiped foldable isolation chamber provided with means for accessing the inside of the enclosure and with means for attachment to the supporting structure when it is collapsible inside the transporting case in a closed position (F), in such a way to be uncollapsed or popped up automatically when the transporting case is placed in an open position (O).

Such a containment device presents the benefit of being easily transportable in the form of a parallelepiped case, of low volume inside, wherein all the elements necessary to constitute a containment enclosure are located, presenting a form and a volume that are sufficient to enable dangerous products to be handled comfortably. Indeed, the case and the hinged structure which connect the two half-cases fulfil, on the one hand, a storage function, and, on the other hand, a support and unfolding function of the flexible containment enclosure, in such a way that this flexible containment enclosure can easily be implemented and pre-formed without complex montage or assembly operations. In addition, insofar as the half-cases are, in an uncollapsed position or open from the case, distant from each other, in such a way to correspond to two opposite faces of the uncollapsed containment enclosure, the invention enables for a volume, in a closed position from the case, a lesser obtaining of an enclosure containing a volume equal to that obtained by the device proposed by the aforementioned US request. Moreover, the removable character of the containment enclosure enables its replacement when the interior wall has been contaminated or in the event of the said enclosure or the accessories equipping it being damaged.

According to an embodiment of the invention, the hinged structure comprises two foldable arms, each being formulated on two half-cases close to two opposite corners, and each comprising two segments connected to each other by a pivot joined to the means for maintaining an uncollapsed position, the segments being substantially aligned. Such an embodiment of the hinged structure enables a structure sufficiently stiff to hold the containment enclosure in an uncollapsed position to be simply obtained and at a lesser cost, while being light in such a way to easily make the whole folded or closed entity transportable. According to the invention, the means for maintaining in an uncollapsed position can be fulfilled in any suitable way, and for example, can comprise two lock systems, one on each pivot, adapted to lock when the segments are aligned. According to a preferred variant, the means for maintaining in position are closed on each pivot by a dampening system, which enables the pivot to be stable and not move under the structure's and the enclosure's own weight in any position, such a dampened pivot is also called a torque hinge.

According to a feature of the invention, the portable containment device comprises at least four means of fixing the flexible containment enclosure on each half-case, each fixing means being formed by a male or female part of an additional snap button of another part of a snap button held by the enclosure. The implementation of snap buttons for fixing the containment enclosure on the supporting structure enables simple assembly and disassembly operations with a reduced cost and a particularly optimal weight balance.

According to another feature of the invention, at least one of the half-cases comprises an electrical power supply for accessories, the power supply comprising at least one electrical connector directed inside the case. The implementation of such a power supply with a connector directed inside the case enables accessories positioned inside the containment enclosure to be supplied.

According to a variant of this feature, the portable device comprises a removable ultraviolet ray source, comprising an additional plug connection to that of the power supply. Such a removable ultraviolet source enables organic decontamination to be ensured inside the flexible containment enclosure after using it.

According to another feature of the invention, the portable containment device comprises at least one light source integrated in the hinged structure and adapted to light up the inside of the flexible containment enclosure by being located on its outside. The implementation of such an integrated light source enables the comfort in using the containment enclosure and the whole portable device to be increased, according to the invention. The integrated light source can be achieved in any appropriate way. In a preferred form but not exclusive, the light source is made in the form of one or several electroluminescent diodes integrated in the arms of the hinged structure, and preferably, in the upper arm, in such a way to ensure lighting from the top to the bottom to limit the glare of the manipulating user in the flexible containment enclosure According to a feature of the invention, the half-cases present a substantially rectangular general shape and are additional.

According to another feature of the invention, the portable device presents a mass lower than or equal to 25 kg, and preferable less than or equal to 15 kg.

The invention also relates to a plastic, removable, flexible containment enclosure, in part at least transparent, intended to form a foldable isolation chamber, for manipulating organic and/or chemical substances, intended to be adapted, in a portable device according to the invention, into a generally rectangular containment enclosure equipped with means to access the inside of the enclosure and means for fixing to a supporting structure, characterised in that the isolated fixing means are placed close to two lateral faces of the enclosure, at a rate of at least four fixing means close to each face and which each comprise at least a male or female part of a snap button directed towards the outside of the enclosure.

According to a feature of the invention, close to each lateral face, two fixing means are located on an upper face and two others on an opposite lower face.

According to another feature of the invention, each part of the snap button is crimped or riveted on the material constituting the walls of the enclosure and the enclosure comprises, on each part of the snap button, a watertight sealing membrane fixed on the inside face of the corresponding wall.

The implementation of a watertight sealing membrane on each part of the snap button crimped on the material constituting the walls enables the snap buttons to be watertight, and avoids risks of tearing or injury when hanging the flexible containment enclosure on the supporting structure of the containment device, conforming with the invention, wherein it is intended to be integrated.

According to another feature of the invention, the means for accessing the inside of the enclosure comprise, on a front face, two openings for hands and/or forearms to pass through, and on a rear, opposite face, at least one opening for introducing objects into the enclosure, the said introduction opening being equipped with watertight closing means.

According to a variant of this feature, the watertight closing means of the introduction opening comprise at least two parallel closing sliders, extending over at least the whole length of the opening. The implementation of two sliders enable to guarantee that the closure is effective and watertight. Each closing slider is preferably formed by a longitudinal, plastic rail, intended to be entered into a recess which is defined by two parallel, flexible lips, and which present an additional form to that of the longitudinal rail.

According to another variant of this feature, the watertight closing means comprise a tubular sleeve which extends towards the outside of the casing of the containment by being, on the one hand, fixed watertight on the peripheral edge of the introduction opening and, on the other hand, equipped on its free end with at least one sliding closure, the sleeve being adapted or configured to be rolled up around the sliding closure. Such an embodiment enables, on the one hand, a good level of being watertight, and, on the other hand, a protection of the sliding closure by avoiding it being folded.

According to an embodiment of the invention, the watertight closing means of the introduction opening are configured to form an introduction airlock, comprising at least two watertight closures configured to be closed or opened independently of each other, in such a way that when one is open and the other one closed, the inside of the cell does not communicate with the outside environment through the introduction opening. The implementation of such an airlock enables to limit as far as possible, fluid circulation between the inside of the enclosure and the outside environment, when introducing objects and particularly samples inside the enclosure during use.

According to a feature of this embodiment, the watertight closing means of the introduction opening comprise two flexible, coaxial, tubular sleeves, inside and outside, which each comprise an end fixed watertight on the peripheral edge of the introduction opening and an end comprising at least one watertight closure.

According to a variant of this feature, the watertight closure of at least one of the sleeves comprises a sliding closure and an attachment system configured to hold the sleeve corresponding in part at least, rolled up around the sliding closure.

According to a feature of this embodiment, one of the sleeves is configured to be, in part at least, entered into the other sleeve, when it is closed. This feature enables to limit the congestion, inside the cell for example.

According to another feature of this embodiment, the introduction airlock comprises at least one connector configured to enable the injection or suction of fluid in the airlock.

According, again, to another feature of this embodiment, the introduction airlock comprises at least one vent pipe which connects the inside of the airlock to the inside of the enclosure, and which comprises an anti-return system adapted to block fluid circulation in the vent pipe inside the enclosure towards the inside of the airlock and to enable fluid circulation in the opposite direction.

According to a feature of the invention, passage openings are each equipped with an adapter ring of a sleeve and/or a removable glove, each ring being connected watertight to the corresponding wall. The implementation of such adapter rings enable the user to choose the way they handle the products located inside the containment enclosure, in particular according to these products' level of danger.

According to a variant of this feature, the two adapter rings are adapted to slot into each other. Such a slotting enables the containment enclosure to be collapsible on itself, while ensuring it is closed in such a way to limit exchanges between the inside of the enclosure and the outside environment.

According to a feature of the invention, the enclosure comprises on the inside face of the upper wall, means for fixing a lamp. These fixing means particularly enable an ultraviolet lamp to be hung to ensure decontamination inside the enclosure.

According to another feature of the invention, at least one of the lateral walls of the enclosure comprises a window for passing through a power supply or electric plug. The implementation of such a passing window, enables the connection of electrical accessories located inside the enclosure to be ensured and used by the enclosure's user.

According to a variant of this feature, the passing window is defined by an elastically-deformable collar, adapted to mould the edge of the power supply. The elastically-deformable collar thus enables to ensure that the enclosure is watertight on the level of the power supply.

Of course, the different features, variants and embodiments of the invention can be associated with each other according to various combinations, insofar as they are not incompatible or exclusive from each other.

Moreover, various other features of the invention emerge from the appended description made in reference to the drawings which illustrate the non-exhaustive forms of embodiment of a containment device, that conforms with the invention, and a flexible, removable containment enclosure according to the invention intended to be implemented inside such a containment device.

FIG. 3 is a diagrammatic view, seen in a three-quarter profile from the right, of the transporting case illustrated in FIG. 1 in an open position and equipped with a flexible, removable containment enclosure, all this forming the containment device according to the invention.

FIG. 8 is a diagrammatic sectional view showing constructive details of the fixing means equipping the flexible containment enclosure.

FIG. 9 is a perspective view of details of the containment device according to the invention.

FIGS. 12 and 13 are partial diagrammatic views, showing details of the embodiment of a sleeve constituting the flexible enclosure represented in FIG. 11.

FIG. 14 is a side view of a variant of the embodiment of the flexible containment enclosure constituting a containment device according to the invention, such as illustrated in FIG. 11.

It must be noted that on these figures, the structural and/or functional elements common to different variants can present the same references.

Figure 1:
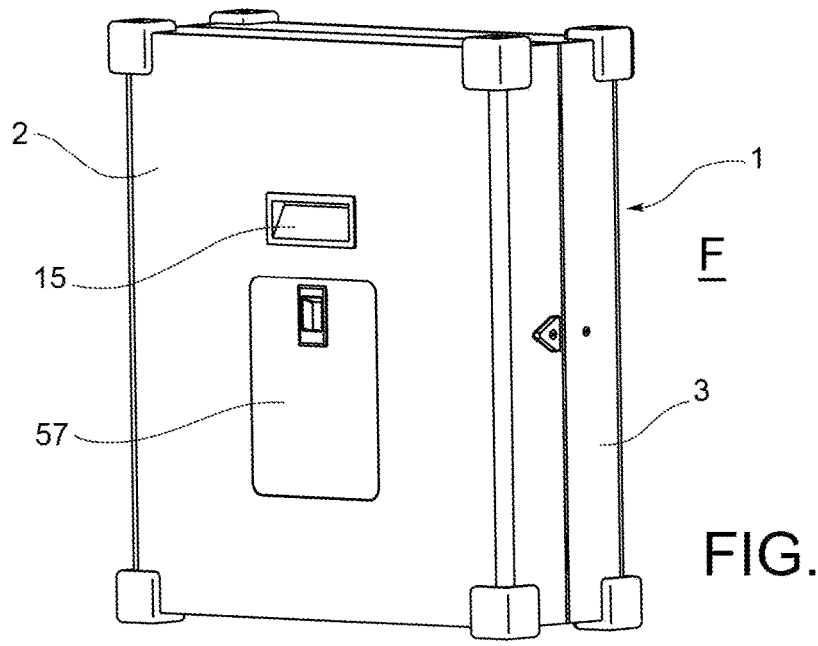
FIG. 1 is a diagrammatic view of a transporting case constituting a portable containment device according to the invention, the transporting case being in a closed position.

A portable containment device for manipulating organic and/or chemical comprises a transporting case 1, illustrated in FIG. 1, formed from two half-cases 2 and 3 which each present a substantially rectangular general shape and are additional to define a storage volume.

Figure 2:
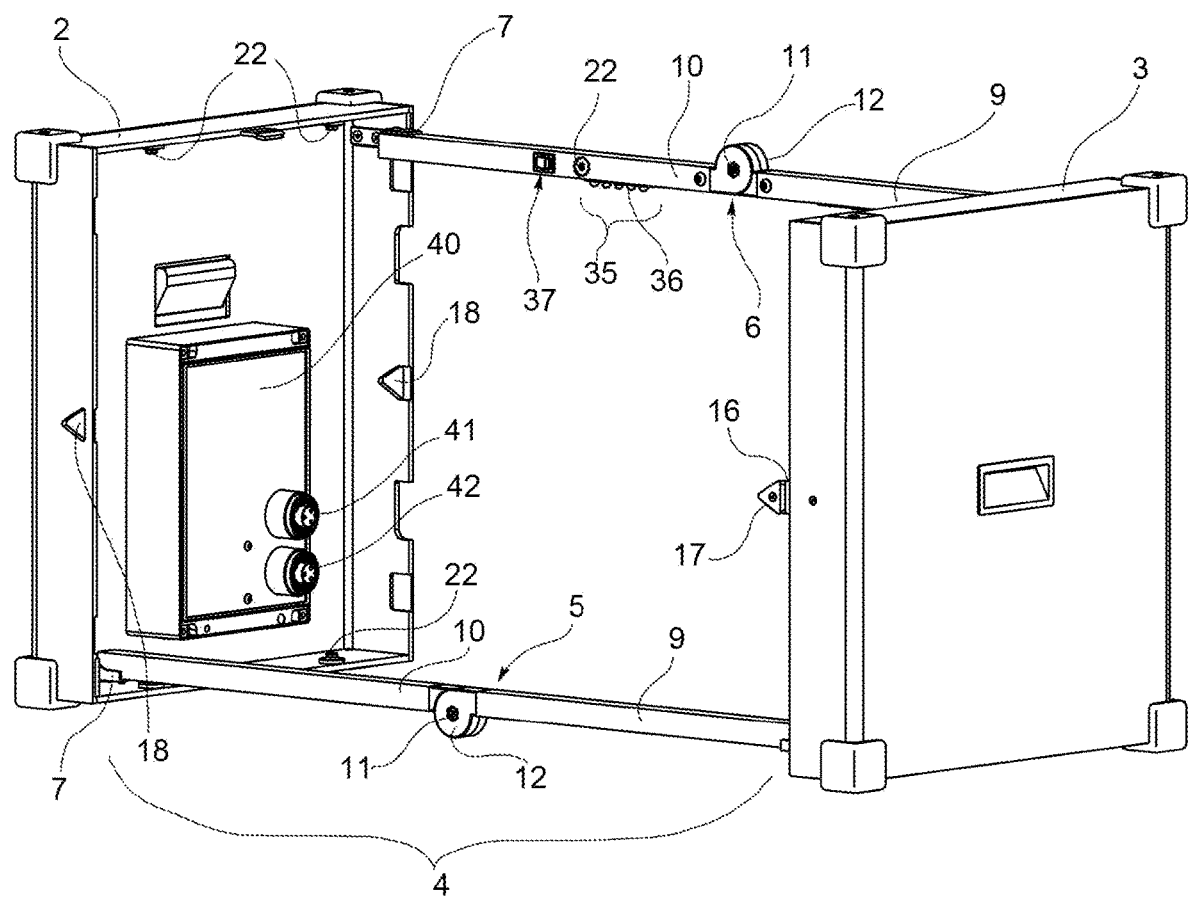
FIG. 2 is a diagrammatic view, seen in a three-quarter profile from the left, of the transporting case illustrated in FIG. 1 in an open position.

As FIG. 2 shows, the half-cases 2 and 3 are connected by a hinged structure 4 in such a way to be movable between a closed position C such as illustrated in FIG. 1 and an open position O represented in FIG. 2. According to the example illustrated, the hinged structure 4 comprises two foldable arms 6 and 5 which are fixed, by pivot connections 7, to the two opposite corners of each half-case 2, 3.

In this case, each foldable arm 5, 6 comprises two segments 9, 10 of the same length which are connected to each other by a pivot 11 joined to positional holding means 12 which here are formed by a dampening system in such a way that the whole pivot 11 and the holding means 12 constitute a torque hinge. The segments 9, 10 of each arm 5, 6 are additionally connected on their opposite ends to the pivot 11, to a half-case 2, 3 by the corresponding pivot 7. The foldable arms 5 and 6 are assembled in such a way to fold back towards the inside of the case 1 in a vertical plane parallel to the small vertical sides of the case.

Each half-case 2, 3 comprises a handle 15 on its outside face, which facilitates the manipulating of the case 1 to open it. Moreover, one of the half-cases, here the left-hand half-case 3 comprises, as means for locking the case in a closed position, elastic strips 16, only one of which is visible in FIG. 2. Each elastic strip 16 carries a spur 17, intended to be entered into an additional window 18, arranged on another half-case 2. Of course, the locking means could be fulfilled in any other suitable way.

Figure 4:
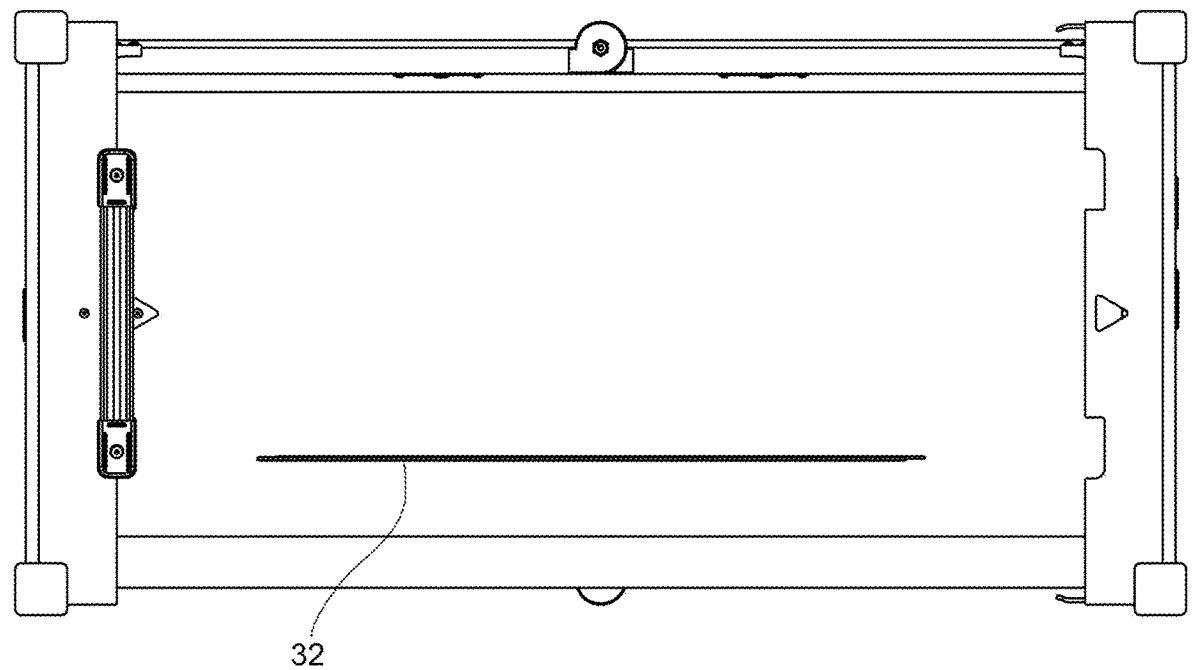
FIG. 4 is an elevated rear view of the containment device according to the invention, in its configuration illustrated in FIG. 3.
Figure 10:
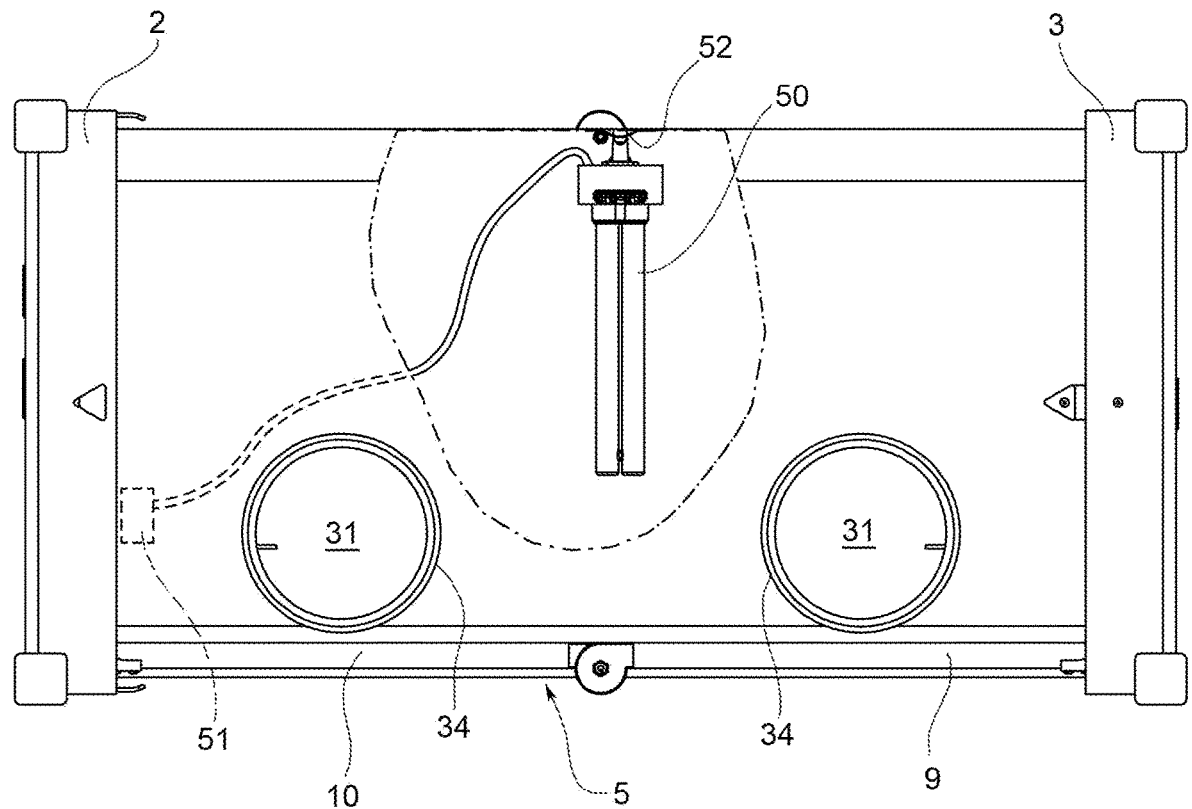
FIG. 10 is an elevated front view, partially extracted, of the containment device according to the invention, such as illustrated in FIGS. 3 and 4.

The case 1 in an open position O with the hinged structure 4 in uncollapsed form, as this is shown in FIGS. 3 and 4, a supporting structure for a flexible containment enclosure 20, which is fixed in such a way that it is removable on the said supporting structure. The removable character of the flexible containment enclosure 20 enables its replacement as needed, without this replacement affecting the rest of the containment device. Moreover, the flexible character of the containment enclosure enables it to be fixed on the supporting structure, particularly the half-cases, when the supporting structure is collapsible in such a way to close the case, by locking the containment enclosure inside. Thus, during the opening of the case and the unfolding of the following supporting structure, the containment enclosure is preformed in a semi-automatic way, without the laborious assembly operation of the supporting structure and fixing of the containment enclosure to the supporting structure.

Figure 5:
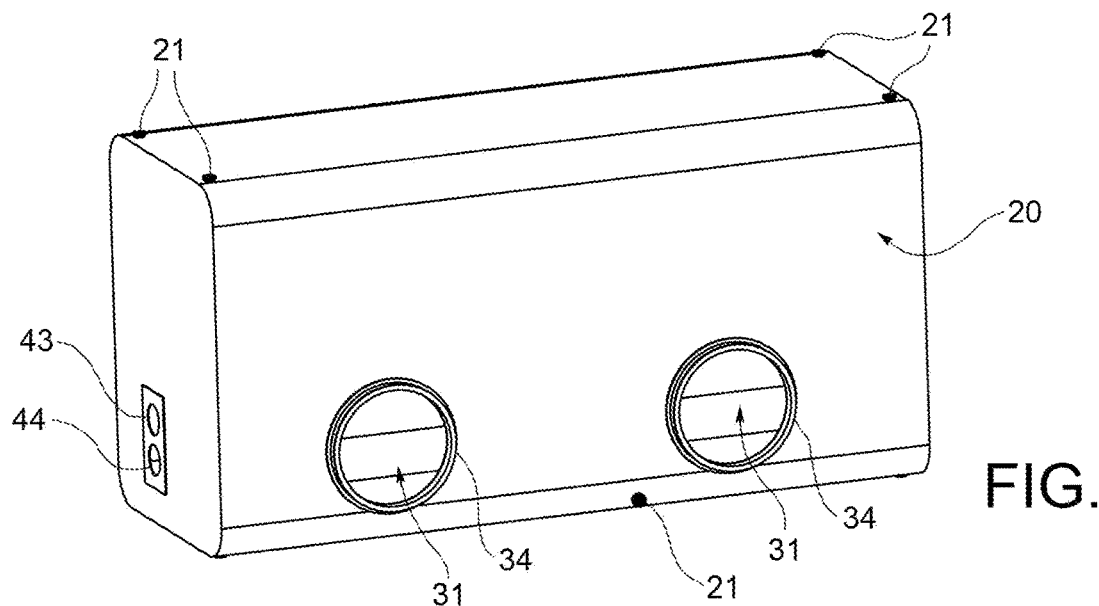
FIGS. 5 to 7 are different views showing a flexible, removable containment enclosure constituting a containment device according to the invention, in its configuration illustrated in FIGS. 3 and 4.
Figure 6:
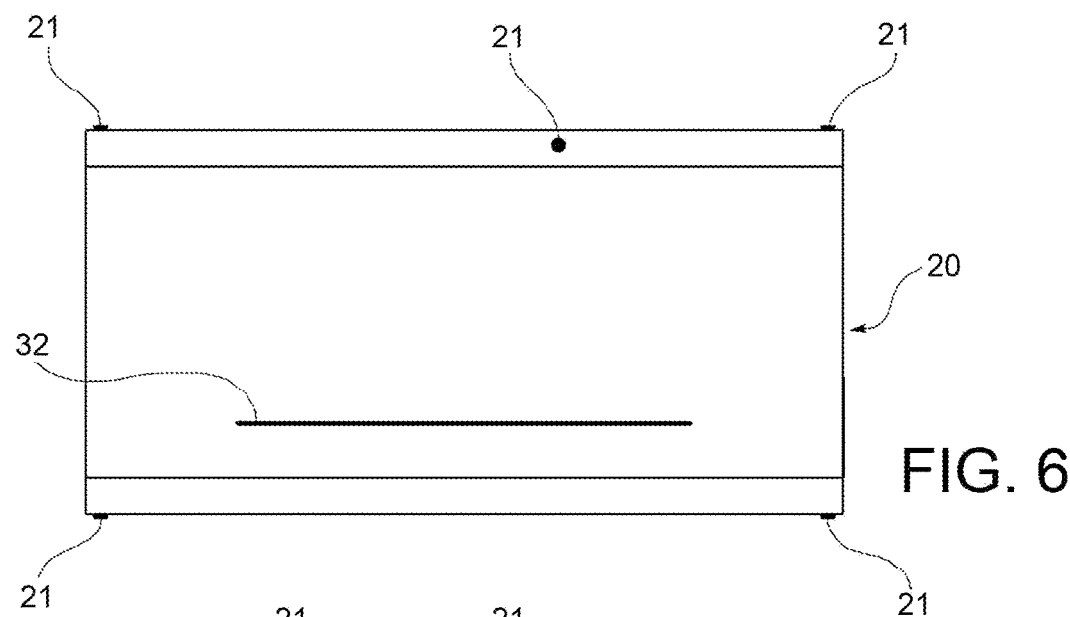

The flexible containment enclosure 20, illustrated by itself in FIGS. 5 to 6, presents a rectangular general shape and is made, in this case, in a transparent material, such as a PVC sheet, on the understanding that any other suitable flexible material could be used. In this case, the flexible containment enclosure 20 presents a general extended shape, according to a substantially horizontal axis, in a position of use, so that its large faces are formed by one same panel, of which the extreme edges are assembled watertight to form a tube, of which the ends are each closed by a panel forming a lateral face of the enclosure, this panel being assembled watertight on the edges, defining the corresponding end of the tube.

In order to enable the containment enclosure 20 to be fixed to the supporting structure constituted by the case in an open position, the containment enclosure 20 comprises fixing means 21 on the supporting structure. In this case, the fixing means 21 are each formed by a snap button part, intended to cooperate with an additional snap button part 22, held by the supporting structure. Here, the snap button parts 21, separate from the containment enclosure 20, are female parts, while the snap button parts 22, separate from the supporting structure, are male parts 22, additional to the female parts 21. According to the example illustrated, the containment enclosure 20 comprises, close to these lateral faces, four fixing means 21 on the corresponding half-case. Two fixing means 21 are thus positioned on the upper face of the containment enclosure 20 to cooperate with the additional means 22 held by the inside face of the upper lateral panel of the corresponding half-case, while two other fixing means are positioned on the opposite lower face of the containment enclosure 20, and are intended to cooperate with the additional fixing means held by the lower panel of the corresponding half-case.

The flexible enclosure 20 additionally comprises, on its large rear lateral face, visible in FIG. 5, a fixing means 21 on the upper foldable arm 6, which also comprises an additional fixing means 22, visible in FIG. 2. The flexible enclosure also comprises, on its large front lateral face, visible in FIG. 4, a fixing means 21 on the lower foldable arm 5, which comprises an additional fixing means 22, which is not visible in the figures.

Figure 7:
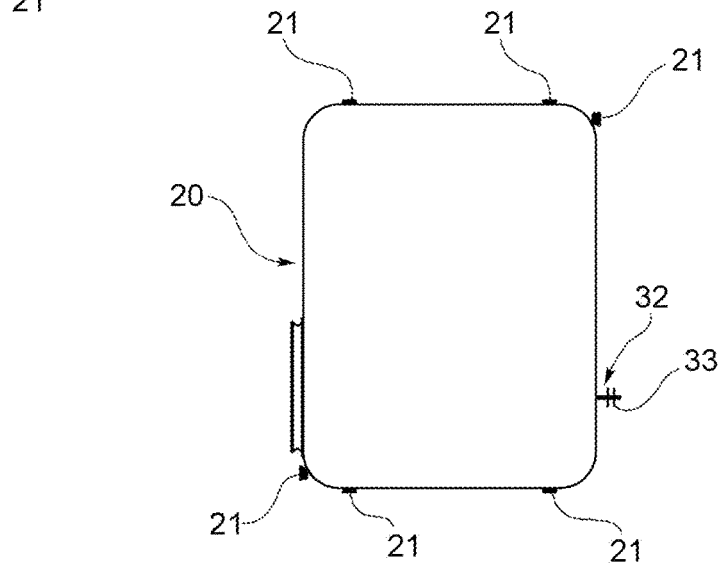

Each snap button part constituting the fixing means 21 of the flexible containment enclosure 20, is riveted or crimped on the material constituting the said enclosure, which thus comprises a watertight sealing membrane 25 fixed watertight on the inside face of the corresponding wall, as FIG. 7 shows. This sealing membrane 25 guarantees the fixing means to be perfectly watertight, and avoid any alteration of being watertight when necessary effort is used to insert the female snap button parts of the enclosure on the male snap button parts of the case 1 and of its hinged structure 4.

In order to enable dangerous products to be handled within it while it is held uncollapsed by the case 1 and the hinged structure 4 in an open position O, the containment enclosure 20 presents, as access means inside the enclosure that it defines, two openings 31 for hands or forearms to pass into, positioned on a front face and, on a rear face, an opening 32 to introduce objects into the enclosure.

The introduction opening 32 is thus equipped with watertight closing means 33, which, according to the example illustrated, are formed by two parallel, sliding closures, extending over the whole length of the introduction opening 32. Each sliding closure is similar to that of the slider equipping the freezer bags marketed under the Ziplock® brand. Of course, the watertight closing means could be made in another way, and for example, implementing magnetic lips.

The openings 31 are, in this case, each equipped with an adapter ring 34 of a sleeve or a removable glove. The two adapter rings 34 are preferably adapted to slot into each other, which enables the flexible enclosure to be closed on itself and eases in particular, its folding back inside the case 1, the said case being in a closed position.

In order the ensure lighting inside the containment enclosure 20, the case 1 comprises a light source 35, formed by electroluminescent diodes held by the left segment 10 of the upper foldable arm 6, as FIG. 2 shows. The light source 35 here, is held by the lower face of the segment 10 in such a way to limit the glare of the user during the manipulating of products inside the flexible containment enclosure 20. The light source 35 is operated by a switch 37, also held by the segment 10 in such a way to be able to be operated from inside the containment enclosure 20, thanks to the flexibility of the material which constitutes it.

In order to enable the supply of electrical accessories inside the enclosure, the case 1 comprises, on the left-hand half-case 2, a power supply 40, which comprises at least one, and, according to the example illustrated, two electrical connectors 41, 42 directed towards the inside of the case, as FIG. 2 shows, and therefore towards the containment enclosure 20. The containment enclosure 20 thus comprises, on its lateral wall located on the side of the left-hand half-case 2, at least one, and according to the example illustrated, two passing windows 43, 44 for the power supply part constituting electrical connectors 41 and 42. The passing windows 43 and 44 are defined by a collar, elastically deformable in such a way to mould the edges of the power supply 40, and more specifically, the connectors 41 and 42, as FIG. 9 shows. The deformation of the elastic collar enables to ensure that the passage of the connectors 41, 42 is watertight inside the containment enclosure.

The portable containment device according to the invention additionally comprises, in this case, an ultraviolet ray source 50, comprising a plug connection 51 additional to the connector 41 offered by the power supply 40. The containment enclosure thus comprises hanging means 52, arranged on the inside face of its upper wall, in such a way to enable the source 50 to be suspended inside the enclosure 20. In order to control the working time of the ultraviolet ray source 50, the power supply 40 is equipped with a timer system 55, accessible from the outside of the half-case 1 in a recess 56, likely to be closed by a removable flap 57. The recess 56 enables, additionally, the storage of a non-represented power cable, enabling the power supply 40 to be connected to an external electricity source. It must be noted, that the power supply 40 can also comprise a ballast and starter system, necessary for the supply of the ultraviolet ray source 50, in this case, the plug connection 51 and its associated connector 41 on the power supply 40, are equipped with a foolproof system, so that it is not possible to connect another connector other than the connector 51 onto the connector 41, and that the connector 51 cannot be connected onto another connector 42 of the power supply.

The containment device, such as thus constituted and made in such a way to present a mass suitable to be transported by one single person and preferably in such a way to present a mass lower than 25 kg, and more specifically, preferably lower than 15 kg.

According to the embodiment described previously, the introduction opening 32 presents the form of an extended slit. However, the introduction opening 32 is not necessarily made in this way. Thus, according to another form of embodiment of the invention illustrated in FIG. 11, the introduction opening 32 of the casing of the flexible containment 20, is presented in the form of a substantially circular opening, of which the watertight closing means 33 comprise a flexible tubular sleeve 55, which extends towards the outside of the casing of the containment 20, by being, on the one hand, fixed watertight to the peripheral edge of the introduction opening 32, and, on the other hand, equipped on its free end with at least one sliding closure 56 of the type described previously. The sliding closure 56 is positioned in such a way to be substantially vertical and parallel to the large faces of the half-cases 2, 3 so that when it is closed, this gives a duck-beak shape to the sleeve. In order to strengthen the watertight level, once the sliding closure 56 is closed, the sleeve 55 can be rolled on itself in the direction of the flexible casing and be held in this position by any suitable means, such as, for example, a clamp or an adhesive or fastening attachment system, such as, for example, marketed under the Velcro® brand. Thus, FIGS. 12 and 13, show a fastening material strip 57 held by a face of the sleeve 55 and a buckle material strip 58 held by another face of the sleeve 55 and positioned so that when the sleeve 55 is partially rolled up around the closure 56, the two strips cooperate with each other to hold the sleeve 55 rolled up. In addition to guarantee that it is watertight, this rolling up of the sleeve enables the sliding closure 56 to be protected, by avoiding it being folded which would be likely to damage it.

Figure 11:
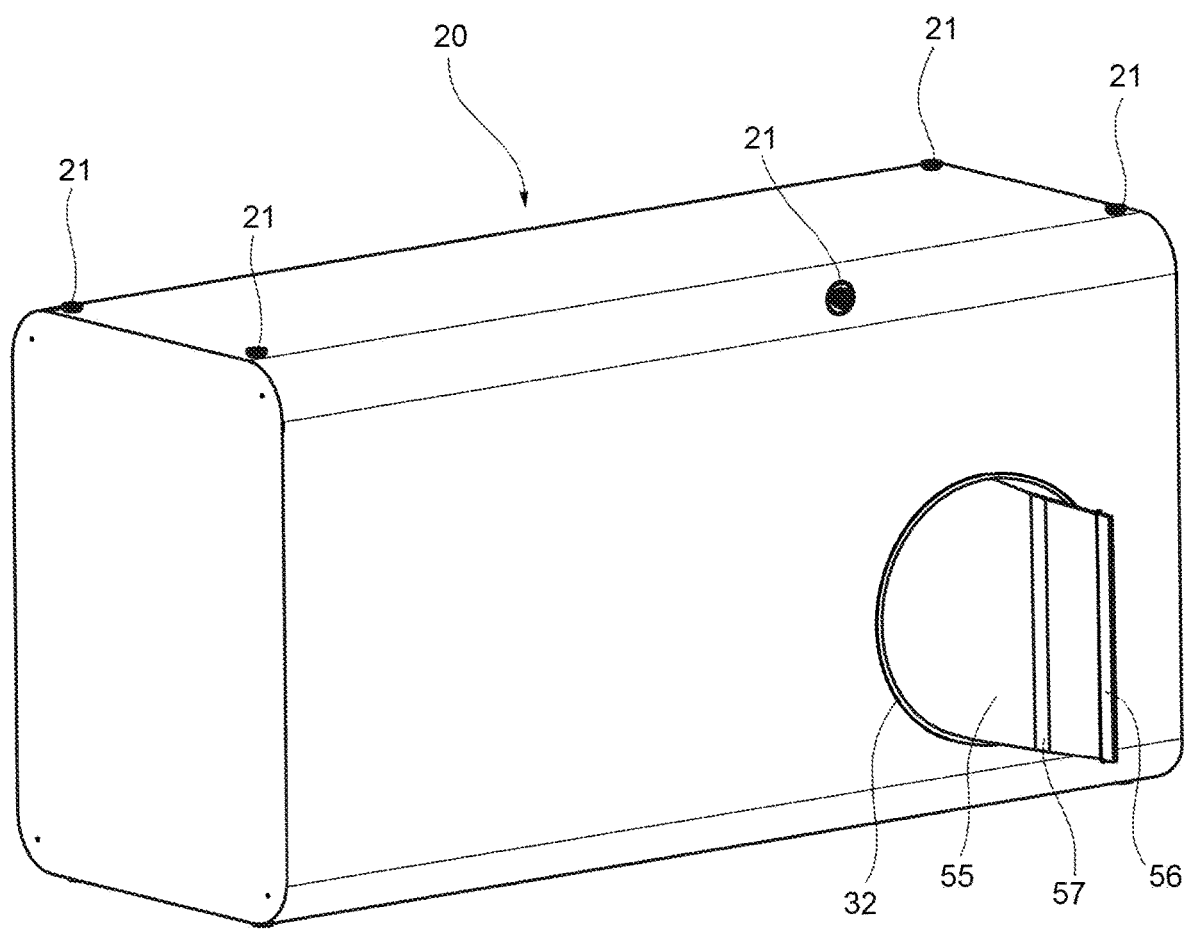
FIG. 11 is a diagrammatic rear view of an embodiment of the flexible containment enclosure, constituting a containment device according to the invention.

FIGS. 12 to 14 illustrate a variant of the form of embodiment represented in FIG. 11. According to this variant, the closing means of the introduction opening 32 comprise, in addition to the external tubular sleeve 55, a flexible, internal tubular sleeve 60, substantially coaxial to the external sleeve 55. The external tubular sleeve 60 extends to inside the enclosure 20 by being fixed watertight to one of its ends, on the peripheral edge of the introduction opening 32, while its free end comprises a watertight closure 61, such as a sliding closure, as described previously. The internal sleeve 60 is substantially similar in its constitution and its implementation to the external sleeve 55. The two sleeves 55 and 60 constitute closing means of the introduction opening 32, which define, in addition, an introduction airlock 62. Indeed, by keeping one of the closures 56 or 58 closed, it is possible to open the other closure without the inside of the cell 20 communicating with the outside environment through the other opening. This enables objects to be introduced and removed in the enclosure 20, while limiting risks of contamination.

According to the example illustrated, the internal sleeve 60 is configured to be entered into the external sleeve 55, in such a way to free the space inside the enclosure 20. For this purpose and according to the example illustrated, the internal sleeve 60 presents an external diameter less than the internal diameter of the external sleeve 55. However, the two sleeves can present one same size or identical dimensions. The flexibility of the internal sleeve being utilised to enter it into the external sleeve.

Moreover, in order to ease this movement, a vent pipe 62 is implemented, which connects the inside of the airlock 61 to the inside of the enclosure 20, and which comprises an anti-return system 63, adapted to block fluid circulation in the vent pipe from the inside of the enclosure to the inside of the airlock, and to enable fluid circulation in the opposite direction. According to the example illustrated, the vent pipe 62 is connected to the airlock 62, to the external sleeve 55, and to the wall of the flexible enclosure 20.

In addition, according to the example illustrated, a connector 63 configured to enable the injection or suction of fluid in the airlock 62 is implemented, while keeping the airlock watertight when the connector 63 is not used. In this case, the connector 63 is positioned on the external sleeve 63. The connector 63 can be used to ensure decontamination inside the airlock before it is opened to pass through an object in one direction or in another direction.

Of course, various other variants of the embodiments of the case 1 and the flexible casing 20 constituting the containment device according to the invention, can be considered as part of the appended claims.

The invention claimed is:

1. A portable containment device for manipulating organic and/or chemical substances, comprising:
   a transporting case including two half-cases connected by a hinged structure such as to be movable between a closed position, in which the half-cases are against one another along a horizontal direction and define a stowing space for at least the hinged structure, and an open position, in which the half-cases are spaced apart from one another by being maintained vertical by the hinged structure and in which the half-cases and the hinged structure form a supporting structure for a foldable containment enclosure,
   and a plastic, removable and foldable containment enclosure that is at least partially transparent, for forming a generally parallelepiped foldable isolation chamber provided with openings for accessing the inside of the enclosure and with attachment members to the supporting structure,
   the containment enclosure being adapted to remain fixed to the supporting structure, when it is collapsible inside the transporting case in a closed position, in such a way to be uncollapsed or popped up automatically when the transporting case is placed in an open position.

2. The portable containment device according to claim 1, wherein the hinged structure comprises two foldable arms, which are each formulated on two half-cases, close to two opposite corners facing each other along a horizontal direction, and which each comprise two segments, connected to each other by a pivot joined to a lock system for holding in an uncollapsed position, the segments being substantially aligned.

3. The portable containment device according to claim 1, wherein the attachment members comprises at least four snap buttons for fixing the containment enclosure on each half-case, each fixing snap buttons being formed by a male or female part of a snap button, additional to another snap button part held by the enclosure.

4. The portable containment device according to claim 1, wherein at least one of the half-cases comprises an electrical power supply for accessories, the power supply comprising at least one electrical connector directed towards the inside of the case.

5. The portable containment device according to claim 4, wherein the device further includes a removable ultraviolet ray source comprising a plug connection additional to that of the power supply.

6. The portable containment device according to claim 1, wherein the device further includes at least one light source integrated in the hinged structure and adapted to light up the inside of the containment enclosure, by being located outside of the containment enclosure.

7. The portable containment device according to claim 1, wherein the half-cases present a substantially rectangular general shape.

8. The portable containment device according to claim 1, wherein the containment enclosure is intended to form a foldable isolation chamber for manipulating organic and/or chemical substances,
   wherein the attachment members for fixing to the supporting structure are positioned close to the two lateral faces of the enclosure, at a rate of at least four fixing snap buttons close to each face and which each comprise at least one male or female part of a snap button directed towards the outside of the enclosure.

9. The portable containment device according to claim 8, wherein close to each lateral face, two fixing snap buttons are located on an upper face and two others on an opposite lower face.

10. The portable containment device according to claim 8, wherein each snap button part is crimped or riveted on the material constituting the walls of the enclosure and in that the enclosure comprises, on each snap button part, a watertight closure is fixed on the internal face of the corresponding wall.

11. The portable containment device according to claim 8, wherein the openings for accessing the inside of the enclosure comprise on a front face, two openings for passing through hands and/or forearms and, on the opposite rear face, at least one opening for introducing an object into the enclosure, equipped with a watertight closure.

12. The portable containment device according to claim 11, wherein the passing openings are each equipped with an adapter ring of a sleeve and/or a removable glove, each ring being connected watertight to the corresponding wall.

13. The portable containment device according to claim 12, wherein the two adapter rings are adapted to slot into each other.

14. The portable containment device according to claim 8, wherein the device further includes, on the internal face of the upper wall, a lamp attachment.

15. The portable containment device according to claim 8, wherein at least one of its lateral walls comprises a window for passing through a power supply or power outlet,
the passing window being defined by an elastically-deformable collar to mould an edge of at least one part of the power supply to ensure this passage window is watertight.

16. The portable containment device according to claim 8, wherein the openings for accessing the inside of the enclosure comprise on a front face, two openings for passing through hands and/or forearms and, on the opposite rear face, at least one introduction opening for introducing an object into the enclosure, equipped with a watertight closure.

17. The portable containment device according to claim 16, wherein the watertight closure of the introduction opening is configured to form an introduction airlock comprising at least two watertight closures, configured to be closed or opened independently from each other, in such a way that when one of them is open and the other closed, the inside of the cell does not communicate with the outside environment through the introduction opening.

18. The portable containment device according to claim 17, wherein the watertight closure of the introduction opening comprise two flexible, coaxial tubular sleeves, internal and external, which each comprise an end fixed watertight on a peripheral edge of the introduction opening and one end comprising at least one watertight closure.

19. The portable containment device according to claim 18, wherein the watertight closure of at least one of the sleeves comprises a sliding closure and an attachment system, configured to hold the corresponding sleeve, in part at least rolled up around the sliding closure.

20. The portable containment device according to claim 18, wherein one of the sleeves is configured to be, in part at least entered, when it is closed, into the other sleeve.

21. The portable containment device according to claim 17, wherein the introduction airlock comprises at least one connector configured to enable the injection or suction of fluid in the introduction airlock.

22. The portable containment device according to claim 17, wherein the introduction airlock comprises at least one vent pipe which connects the inside of the introduction airlock to the inside of the enclosure, and which comprises an anti-return system, adapted to block fluid circulation in the vent pipe from the inside of the enclosure to the inside of the introduction airlock and to enable fluid circulation in the opposite direction.

* * * * *